US011688301B2

(12) United States Patent
Rafferty et al.

(10) Patent No.: US 11,688,301 B2
(45) Date of Patent: Jun. 27, 2023

(54) SECURE TACTILE DISPLAY SYSTEMS

(71) Applicant: Capital One Services, LLC, McLean, VA (US)

(72) Inventors: Galen Rafferty, McLean, VA (US); Austin Walters, McLean, VA (US); Jeremy Goodsitt, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 292 days.

(21) Appl. No.: 17/061,379

(22) Filed: Oct. 1, 2020

(65) Prior Publication Data

US 2022/0108630 A1   Apr. 7, 2022

(51) Int. Cl.
| | | |
|---|---|---|
| *G09B 21/00* | (2006.01) | |
| *G06F 3/06* | (2006.01) | |
| *G06F 3/01* | (2006.01) | |
| *G09F 9/37* | (2006.01) | |

(52) U.S. Cl.
CPC .......... *G09B 21/005* (2013.01); *G06F 3/016* (2013.01); *G06F 3/0623* (2013.01); *G09B 21/004* (2013.01); *G09F 9/377* (2013.01)

(58) Field of Classification Search
CPC .............................. G09B 21/004; G09B 21/005
See application file for complete search history.

(56) References Cited

U.S. PATENT DOCUMENTS

| | | | |
|---|---|---|---|
| 2009/0153513 A1 | 6/2009 | Liu et al. | |
| 2010/0091397 A1* | 4/2010 | Clancy | G06F 21/83 359/893 |
| 2010/0171393 A1* | 7/2010 | Pei | H01L 41/098 359/566 |
| 2011/0115727 A1 | 5/2011 | Feng et al. | |
| 2011/0134058 A1 | 6/2011 | Liu et al. | |
| 2013/0004922 A1* | 1/2013 | Takahashi | G09B 21/004 434/113 |
| 2013/0106244 A1 | 5/2013 | Liu et al. | |
| 2014/0055392 A1 | 2/2014 | Wu | |
| 2015/0121506 A1* | 4/2015 | Cavanaugh | G06F 21/6218 726/16 |
| 2015/0234513 A1 | 8/2015 | Jiang et al. | |
| 2017/0068274 A1* | 3/2017 | Van Hees | G09B 21/008 |
| 2018/0095588 A1* | 4/2018 | Klein | G06F 1/1643 |
| 2020/0201469 A1 | 6/2020 | Oh et al. | |

OTHER PUBLICATIONS

Fukuda, et al., "A 4 V Operation, Flexible Braille Display Using Organic Transistors, Carbon Nanotube Actuators, and Organic Static Random-Accesss Memory," Advanced Functional Materials, 21, pp. 4019-4027, 2011. (Year: 2011).*

* cited by examiner

*Primary Examiner* — Peter R Egloff

(74) *Attorney, Agent, or Firm* — Perkins Coie LLP

(57) ABSTRACT

In certain embodiments, secure data presentation may be facilitated for a tactile system. In some embodiments, the tactile system may include a display having carbon nanotube-based components having a surface that absorbs at least 96% of visible light. The tactile system may obtain tactile data and present the tactile data on the display by adjusting one or more positions of the carbon nanotube-based components based on the tactile data. In some embodiments, the tactile system may obtain environmental data (e.g., lighting data, presence data, etc.) for an environment (in which the display is located) and perform the adjustment of the positions of the carbon nanotube-based components based on (i) the tactile data and (ii) the environmental data.

20 Claims, 8 Drawing Sheets

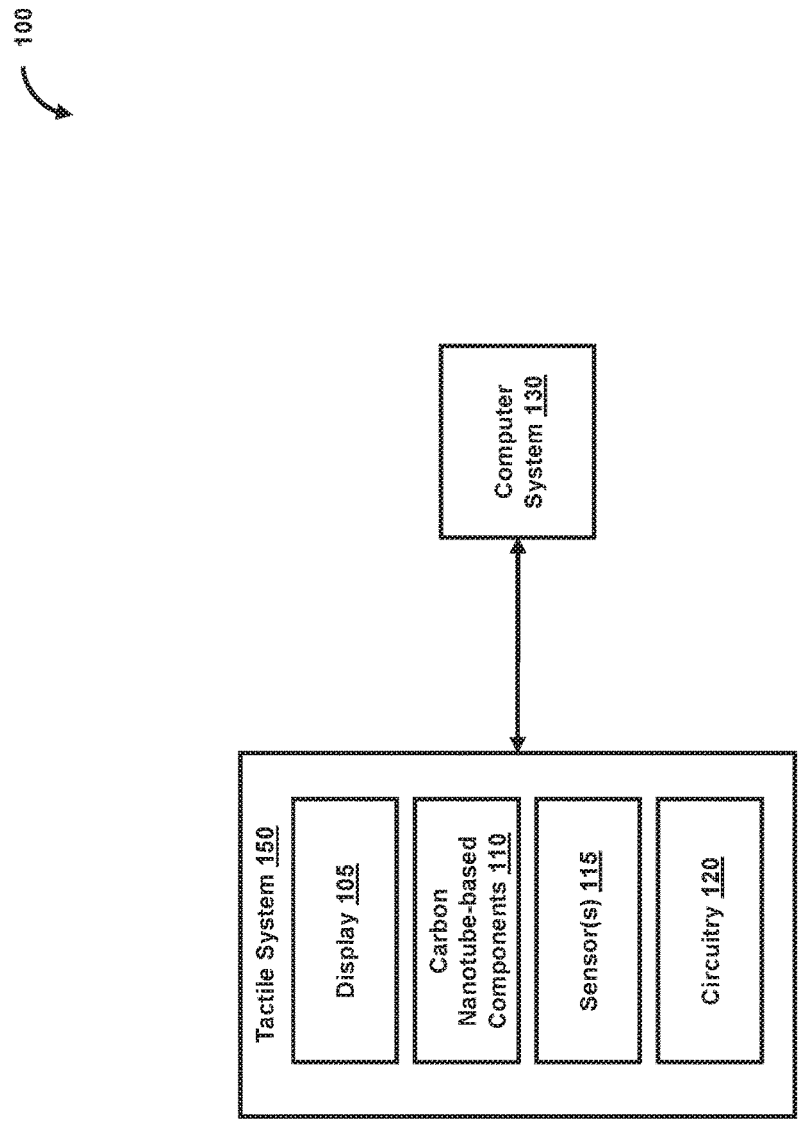

SECURE TACTILE DISPLAY SYSTEMS

TECHNICAL FIELD

The disclosed embodiments relate to tactile display systems, including, for example, tactile displays systems for facilitating secure data presentation by obstructing sight-based access.

BACKGROUND

Many tactile display systems assist individuals with impaired or no vision by presenting electronic information via tactile methods. For example, Braille is a system of touch reading and writing for the vision impaired in which raised dots represent the letters of the alphabet, punctuation marks, or symbols. A typical Braille display includes 12, 20, 40, or 80 Braille cells, allowing for the display of anywhere between 12 and 80 characters at one time. Each Braille cell may be made up of six or eight dot positions arranged in a rectangle comprising two columns of three or four dots each. In a Braille display device, the dots are represented using Braille pins, which are raised or lowered to exhibit Braille code for a specific character.

Current tactile display systems are ineffective in facilitating secure data presentation. For example, information displayed on a Braille display may be (a) easily captured by typical mobile phone cameras or (b) visible to others in proximity of the Braille display user (e.g., a blind user) while the user is unaware of those who are nearby and watching (e.g., when someone is attempting to read messages over the user's shoulders). These and other drawbacks exist.

SUMMARY

Aspects of the disclosed embodiments relate to methods, apparatuses, and/or systems for facilitating secure presentation of data (e.g., tactile data), including, for example, by obstructing sight-based access to the data.

In some embodiments, a tactile system includes a display to present the tactile data. The display may have a carbon nanotube-based surface, which may absorb almost all visible light (e.g., at least 96%, 98%, 99.6%, or other percentages). The display may also use carbon nanotube-based components to exhibit the tactile data. Since the carbon nanotube-based components or the carbon nanotube-based surface absorb almost all visible light, a sight-based access to the tactile data may be prevented, thereby securing the information displayed on the tactile system. As an example, the tactile system may be a Braille device that displays tactile data (e.g., Braille code). The Braille device may include a display that displays the tactile data using carbon nanotube-based components, such as Braille pins, which are raised or lowered for exhibiting the tactile data. The display may have a carbon nanotube-based surface (e.g., a surface coated with or made of carbon nanotube-based material). In some embodiments, carbon nanotube-based material may include Vantablack, Black 3.0, or other materials. As an example, Vantablack may absorb at least 99% of visible light, Black 3.0 may absorb at least 98% of visible light, and certain other carbon nanotube-based materials may absorb at least 99.99% of visible light. Further, in some embodiments, the Braille pins may be made of or coated with carbon nanotube-based material. Since the surface of the display, or the Braille pins, is carbon nanotube-based, almost all visible light incident on the display is absorbed by the surface, thereby obstructing a sight-based access to the tactile data. A user may decipher or access the tactile data using tactile methods (e.g., by touching or feeling the Braille pins using their fingers).

In some embodiments, the tactile system may adjust a presentation of the tactile data based on environmental data (e.g., lighting data, presence data, or other environmental data). As an example, lighting data may include illuminance data, contrast data, color data, or other lighting data. In some use cases, the lighting data may indicate an amount of light in an environment in which the tactile system is located, an amount of light near a portion of the tactile system (e.g., near the display), an amount of contrast between adjacent portions of the tactile system, or colors reflected from one or more surfaces of the tactile system or other surfaces of the environment, etc. Presence data may indicate a presence of a person(s) other than a specified user associated with the tactile system (e.g., a vision-impaired user) in the environment. In some embodiments, the tactile system may adjust the presentation of the tactile data by raising the carbon nanotube-based components to different heights based on the environment data. In some embodiments, the tactile system may raise the carbon nanotube-based components to a first height based on the amount of light satisfying (e.g., exceeding) a first threshold or based on the presence data indicating presence of a person(s) other than the specified user. In some embodiments, the tactile system may raise the carbon nanotube-based components to a second height different from the first height (e.g., greater than the first height) based on the amount of light not satisfying (e.g., equal to or below) the first threshold or based on the presence data not indicating presence of a person(s) other than the specified user. By raising the carbon nanotube-based components to a lower height (e.g., first height) when the amount of light in the environment exceeds the first threshold (e.g., when the environment is sufficiently lit for sight-based access) or when there are people other than the specified user in the proximity of the tactile system, the tactile system may prevent or obstruct sight-based access to the tactile data, while making the tactile data still accessible via tactile methods. In some embodiments, by raising the carbon nanotube-based components to a greater height (e.g., the second height), when the amount of light in the environment is equal to or below the first threshold (e.g., when the environment is not sufficiently lit for sight-based access) or when others are not in the proximity of the tactile system, the tactile system may make the tactile data accessible via tactile methods more conveniently (e.g., the higher raised carbon nanotube components can be felt more easily).

In some embodiments, the tactile system may facilitate security of the tactile data based on the environmental data by presenting obfuscation data or decoy data. For example, the tactile system may display obfuscation data (e.g., random data) along with the tactile data to keep the tactile data secure from sight-based access. In another example, the tactile system may display false data as a decoy on a display of a computer system connected to the tactile system along with the decoy data and tactile data on the tactile system.

In some embodiments, the tactile system may also facilitate secure user input of data. For example, the tactile system may present user-selectable input values on selectable portions of the tactile system by adjusting the positions of the carbon nanotube-based components associated with the selectable portions based on the user-selectable input values and the environmental data. By presenting the user-selectable input values using carbon nanotube-based components and based on the environmental data (e.g., raising the carbon nanotube-based components to different heights), a sight-based access to the input values may be obstructed, thereby making user input of data secure against sight-based access. Further, in some embodiments, the tactile system may assign or change the user-selectable input values assigned to the selectable portions dynamically to make the user input of data more secure against sight-based access.

Various other aspects, features, and advantages of the invention will be apparent through the detailed description and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 1A shows a system for facilitating secure presentation of data in a tactile system, in accordance with one or more embodiments.

DETAILED DESCRIPTION

Figure 1B:
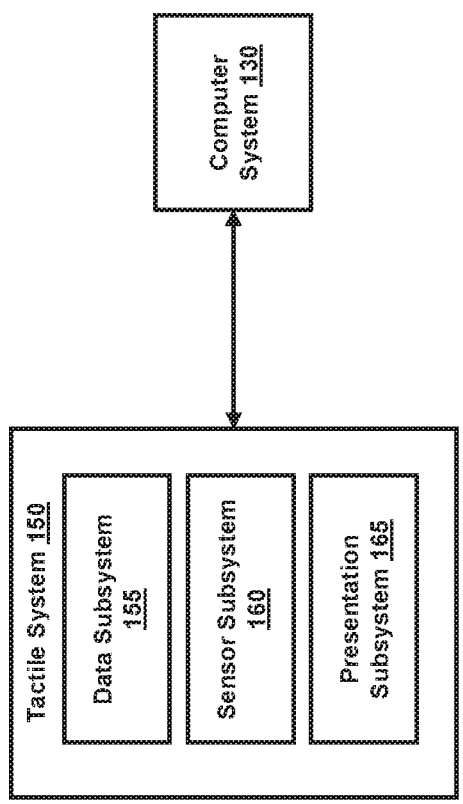
FIG. 1B shows another system for facilitating secure presentation of data in a tactile system, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows a system 100 for facilitating secure presentation of data in a tactile system, in accordance with one or more embodiments. As shown in FIG. 1A, system 100 may include tactile system 150, computer system 130, one or more server systems, or other components. Tactile system 150 may include display 105, carbon nanotube-based components 110, sensor(s) 115, circuitry 120, or other components. In some embodiments, tactile system 150 may include a system that presents tactile data (e.g., a tactile representation of data). By the way of example, tactile system 150 may include a Braille device that displays data in the form of Braille code, which can be accessed via tactile methods (e.g., touch, or other methods). The tactile system 150 may be connected to computer system 130 and may receive data from computer system 130 (or a server system) for presentation as tactile data on display 105 or may send data to computer system 130 for presentation as data on a display of computer system 130 in a visible spectrum. By the way of example, computer system 130 may include any computing device, such as a personal computer (PC), a laptop computer, a tablet computer, a hand-held computer, other computer equipment.

A component of system 100 may communicate with one or more components of system 100 via a communication network (e.g., Internet, a mobile phone network, a mobile voice or data network, a cable network, a public switched telephone network, or other types of communications networks or combinations of communications networks). The communication network may be a wireless or wired network.

It should be noted that, while one or more operations are described herein as being performed by particular components of system 100, those operations may, in some embodiments, be performed by other components of system 100. As an example, while one or more operations are described herein as being performed by components of tactile system 150, those operations may, in some embodiments, be performed by components of computer system 130 or one or more server systems.

In some embodiments, tactile system 150 facilitates secure presentation of tactile data (e.g., by obstructing sight-based access to the tactile data or other approaches). Tactile system 150 includes display 105 that displays tactile data using carbon nanotube-based components 110 (e.g., by adjusting a position of one or more carbon nanotube-based components 110). A user, such as a vision-impaired person, may access the tactile data via a tactile method, such as by touching the carbon nanotube-based components. Carbon nanotube-based components 110 may be made of or coated with a carbon nanotube-based material, which absorbs a significant amount of visible light (e.g., at least 96%, 98%, 99.6%, or other percentages), thereby obstructing a sight-based access to the tactile data. In some embodiments, a carbon nanotube-based material may include Vantablack, Black 3.0, or other materials. As an example, Vantablack may absorb at least 99% of visible light (e.g., up to 99.965%), Black 3.0 may absorb at least 98% of visible light, and certain other carbon nanotube-based materials may absorb at least 99.99% of visible light (e.g., up to 99.995%). In some embodiments, display 105 may also have a carbon nanotube-based surface that further aids in obstructing a sight-based access to the tactile data displayed in display 105.

Tactile system 150 may also adjust the presentation of tactile data based on environmental data of an environment in which tactile system 150 is located to further aid in obstructing a sight-based access to the tactile data. In some embodiments, environmental data may include environmental parameters such as lighting data, presence data, or other environmental data. As an example, lighting data may include illuminance data, contrast data, color data, or other lighting data. In some use cases, the lighting data may indicate an amount of light in an environment in which tactile system 150 is located, an amount of light near a portion of tactile system 150 (e.g., near the display), an amount of contrast between adjacent portions of tactile system 150, or colors reflected from one or more surfaces of tactile system 150 or other surfaces of the environment, etc. In some embodiments, presence data may indicate a presence of a person(s) other than a specified user associated with tactile system 150 (e.g., a vision-impaired user) in the environment. In some embodiments, tactile system 150 may adjust the presentation of the tactile data by raising the carbon nanotube-based components 110 to different heights based on the environmental data and the tactile data. For example, tactile system 150 may raise the carbon nanotube-based components 110 corresponding to the tactile data to a first height based on the amount of light satisfying a first threshold (e.g., amount of light exceeding the first threshold). Continuing with the example, tactile system 150 may raise the carbon nanotube-based components 110 corresponding to the tactile data to a second height different from the first height (e.g., greater than the first height) based on the amount of light not satisfying the first threshold (e.g., the amount of light equal to or below the first threshold).

In another example, tactile system 150 may raise the carbon nanotube-based components 110 corresponding to the tactile data to a first height based on the presence data indicating presence of a person(s) other than the specified user in the proximity of tactile system 150. In some embodiments, tactile system 150 may raise the carbon nanotube-based components 110 corresponding to the tactile data to a second height different from the first height (e.g., greater than the first height) based on the presence data not indicating presence of a person(s) other than the specified user in the proximity of tactile system 150.

In some embodiments, the carbon nanotube-based components 110 are more visible when raised to a greater height (e.g., the second height) than when raised to a lower height (e.g., the first height). Accordingly, by raising the carbon nanotube-based components 110 to a lower height (e.g., the first height) when the amount of light in the environment satisfies the first threshold (e.g., when the environment is sufficiently lit for sight-based access) or when there are people other than the specified user in the proximity of tactile system 150, tactile system 150 may reduce, or obstruct, sight-based access to the tactile data, while making the tactile data still accessible via tactile methods. In some embodiments, when the amount of light in the environment does not satisfy the first threshold (e.g., when the environment is not sufficiently lit for sight-based access to the tactile data) or when there aren't any people other than the specified user in the proximity of the tactile system who may access the tactile data, tactile system 150 may make the tactile data accessible via tactile methods more conveniently by raising the carbon nanotube-based components 110 to a greater height (e.g., the higher raised carbon nanotube components 110 can be felt more easily).

In some embodiments, tactile system 150 obtains environmental data using sensor(s) 115. For example, sensor(s) 115 may include a photo sensor to measure an amount of visible light in an environment in which tactile system 150 is located. Sensor(s) 115 may include a camera that captures an image (e.g., still or video) of the environment (e.g., in front of the display of the tactile system 150, around the display, including one or more surfaces of the display, etc.). Sensor(s) 115 may include a microphone that captures audio data (e.g., voices of people) of the environment. In some embodiments, the microphone may be part of the camera. Tactile system 150 may process the image or audio data to determine the presence data (e.g., whether a person other than the user associated with tactile system 150 is present in the proximity of tactile system 150). In some embodiments, tactile system 150 may process the image data to determine the lighting data. As an example, the image data may be processed to determine contrast levels between raised and unraised carbon nanotube-based components. Based on the contrast levels, tactile system 150 may determine that tactile data represented by the carbon nanotube-based components is not sufficient secure. In one use case, tactile system 150 may process the image data to attempt to reproduce the tactile data (e.g., by performing image recognition on the image data to ascertain the presented data). If tactile system 150 determines that the reproduced tactile data matches the tactile data (e.g., the comparison of the reproduction and the real data satisfies a similarity threshold), tactile system 150 may readjust the positions of the carbon nanotube-based components (e.g., by lowering the heights of the components to further reduce sight-based access).

Tactile system 150 may include circuitry 120 that performs a number of operations, including operations described above. For example, circuitry 120 causes display 105 to present the tactile data by adjusting positions of carbon nanotube-based components 110. In another example, circuitry 120 processes the environmental data obtained from sensor(s) 115 to determine whether the environmental data satisfies a specified condition, such as whether an amount of light in the environment satisfies a first threshold, whether the environmental data indicates a presence of people other than the specified user, etc., and may adjust positions of carbon nanotube-based components 110 based on the environmental data.

In some embodiments, circuitry 120 may process the images captured by sensor(s) 115 to determine presence data, which indicates a presence of a person (other than the specified user associated with tactile system 150 (e.g., vision-impaired user)) in the proximity of tactile system 150. For example, circuitry 120 may process the image to extract feature vectors related to attributes of a portion of a body of a person, such as facial attributes. The feature vectors may be related to facial attributes such as width of the face, height of the face, color of the face, height of the nose, width of lips, hair color, etc. Circuitry 120 may compare the feature vectors (e.g., feature vectors related to facial attributes) extracted from the image with feature vectors of the specified user stored in a memory associated with tactile system 150 to determine whether the face captured in the image corresponds to the specified user or a person other than the specified user. In some embodiments, circuitry 120 may automatically determine the presence of a person (other than the specified user) if circuitry 120 determines or recognizes multiple faces in the captured image.

In some embodiments, circuitry 120 may facilitate security of the tactile data based on the environmental data by presenting obfuscation data or decoy data. For example, circuitry 120 may display obfuscation data (e.g., random data) along with the tactile data on display 105 to keep the tactile data secure. In another example, circuitry 120 may display false data on a display of computer system 130 along with the decoy data and tactile data on tactile system 150.

In some embodiments, circuitry 120 may also facilitate secure user input of data using tactile system 150. For example, circuitry 120 may assign user-selectable input values to selectable portions (e.g., Braille cells that display Braille code or keys used to input tactile data) and cause presentation of the user-selectable input values on the selectable portions of tactile system 150 by adjusting the positions of carbon nanotube-based components 110 associated with the selectable portions based on the user-selectable input values and the environmental data. Upon receiving a user selection of a specified selectable portion, a specified user-selectable input value assigned to the specified selectable portion is received. Further, in some embodiments, circuitry 120 may assign or change the user-selectable input values assigned to the selectable portions dynamically to make the user input of data more secured against sight-based access.

In some embodiments, circuitry 120 may communicate with computer system 130 to receive data from computer system 130 for presentation as tactile data on display 105. In some embodiments, data may be received from computer system 130 as tactile data, or circuitry 120 may convert the data received from computer system 130 to tactile data for presentation on display 105. In some embodiments, circuitry 120 may transmit data to computer system 130 for storage in computer system 130, or for display on computer system 130 in visible spectrum.

In some embodiments, circuitry 120 may be implemented as one or more processing devices (e.g., a digital processor, an analog processor, a digital circuit designed to process information, an analog circuit designed to process information, a state machine, and/or other mechanisms for electronically processing information).

FIG. 1B shows a system 175 for facilitating secure presentation of data in a tactile system, in accordance with one or more embodiments. Tactile system 150 may include data subsystem 155, sensor subsystem 160, presentation subsystem 165, or other components. The data subsystem 155 facilitates obtaining data for presentation as tactile data on display 105. For example, data subsystem 155 may receive data from computer system 130 for presentation as tactile data on display 105. In another example, data subsystem 155 may obtain data from user input on tactile system 150. For example, one or more portions of display 205 may be configured as selectable portions that a user may select (e.g., by touching or pressing) to input data. In another example, tactile system 150 may include input keys that a user may use (e.g., touch or press) to input data. In some embodiments, data subsystem 155 may assign user-selectable input values to the selectable portions and cause presentation of the user-selectable input values on the selectable portions by adjusting the positions of carbon nanotube-based components 110 associated with the selectable portions based on the user-selectable input values and the environmental data.

The sensor subsystem 160 may obtain environmental data from sensor(s) 115 of tactile system 150. For example, sensor subsystem 160 may obtain data from a photo sensor that is indicative of an amount of visible light in an environment in which tactile system 150 is located. In another example, sensor subsystem 160 may obtain an amount of light near display 105 or other portion of tactile system 150 from a sensor, such as a camera installed near display 105. In another example, sensor subsystem 160 may obtain data from a camera that captures an image (e.g., still or video) of the environment. In another example, sensor subsystem 160 may obtain data from a microphone that captures audio data (e.g., voices of people) of the environment.

In some embodiments, sensor subsystem 160 may process the image or audio data to determine the presence data (e.g., whether a person other than the user associated with tactile system 150 is present in the proximity of tactile system 150). The sensor subsystem 160 may user various methods in determining a presence of a human in the environment. For example, sensor subsystem 160 may perform person detection in a video stream (e.g., live or recorded), using histograms of oriented gradients (HOG) method. In some embodiments, in the HOG method, sensor subsystem 160 may scan a picture with a detection window of varying size. For each position and size of the detection window, the window may be subdivided in cells. The cells may typically contain only a small part of the person to be detected (e.g., the side of an arm, or the top of the head). In each cell, a gradient may be computed for each pixel, and the gradients may be used to fill a histogram. In some embodiments, the gradient may be a derivative of a function. For example, for a one-dimension (1D) function, f, depending on a variable x, the gradient may be the derivative of the function. At a given point, the derivative gives the local slope of the function. In another example, in a two-dimensional (2D) (x,y) plane in which a function of x and y is a surface giving the altitude at every point, the gradient may be the generalization of the derivative. That is, at a given (x,y) point, the gradient may be oriented towards the direction of maximum slope, and its magnitude may be the slope of the plane tangent to the surface at this point.

In some embodiments, a histogram is a data structure that is used to compress data and to represent its probability distribution. A histogram may have many dimensions (e.g., 1D, 2D, or other dimensions). The sensor subsystem 160 may use 1D histogram to store the gradients. In some embodiments, the values stored in the histogram may be the angle of the gradient, and the weight may be the magnitude of the gradient. After the histograms are generated, sensor subsystem 160 may input the histograms of all cells to a machine learning discriminator to decide whether the cells of the current detection window correspond to a person or not. If a person is detected, sensor subsystem 160 may compare the generated histograms with histograms of a known person (e.g., user associated with tactile system 150) to determine if a person other than the user associated with tactile system 150 is present in the environment. In some embodiments, sensor subsystem 160 may indicate the presence of a person other than the user associated with tactile system 150 to presentation subsystem 165, which may present tactile data on display 105 or computer system 130 accordingly.

In some embodiments, presentation subsystem 165 may facilitate presentation of tactile data on display 105 by adjusting positions of carbon nanotube-based components 110. In some embodiments, presentation subsystem 165 may transmit data to computer system 130 for storage in computer system 130, or for display on computer system 130 in visible spectrum. In some embodiments, presentation subsystem 165 may process the environmental data obtained by sensor subsystem 160 and adjust presentation of tactile data accordingly. For example, presentation subsystem 165 may adjust positions of carbon nanotube-based components 110 based on the environmental data. By way of example, presentation subsystem 165 may raise carbon nanotube-based components 110 to a lower height based on lighting data indicating that an amount of light in the environment satisfies a first threshold or presence data indicating a presence of people other than the user associated with tactile system 150. In another example, presentation subsystem 165 may raise carbon nanotube-based components 110 associated with display 105 to a lower height and raise carbon nanotube-based components 110 associated with input keys of tactile system 150 to a greater height based on lighting data indicating that an amount of light near display 105 satisfies a first threshold but an amount of light in the environment (e.g., near input keys) not satisfying the first threshold.

In another example, presentation subsystem 165 may present decoy data based on the presence data indicating a presence of people other than the user associated with tactile system 150. In some embodiments, decoy data, such as decoy documents, honey pots and other bogus information may be generated on demand and used to confuse an onlooker or an unauthorized person. For example, in a tactile system 150 such as an automated teller machine (ATM), decoy data (e.g., false account user name, false account number, false transaction amount, or other such data) may be displayed on a display of the ATM to keep such data from being accessible to an onlooker, an unauthorized person, or a camera used to record the display. In another example, presentation subsystem 165 may present decoy data on a display of computer system 130 while displaying tactile data on display 105 with or without decoy data.

In another example, presentation subsystem 165 may adjust presentation of the tactile data by obfuscating the tactile data based on the presence data indicating a presence of people other than the user associated with tactile system 150. In some embodiments, obfuscation may be the obscuring of the intended meaning of communication by making the message difficult to understand, usually with confusing or ambiguous language. The presentation subsystem 165 may obfuscate the tactile data by adding obfuscation data to data displayed on a display of computer system 130 or to tactile data displayed in display 105 (an example of which is described at least with reference to FIG. 6).

Figure 2A:
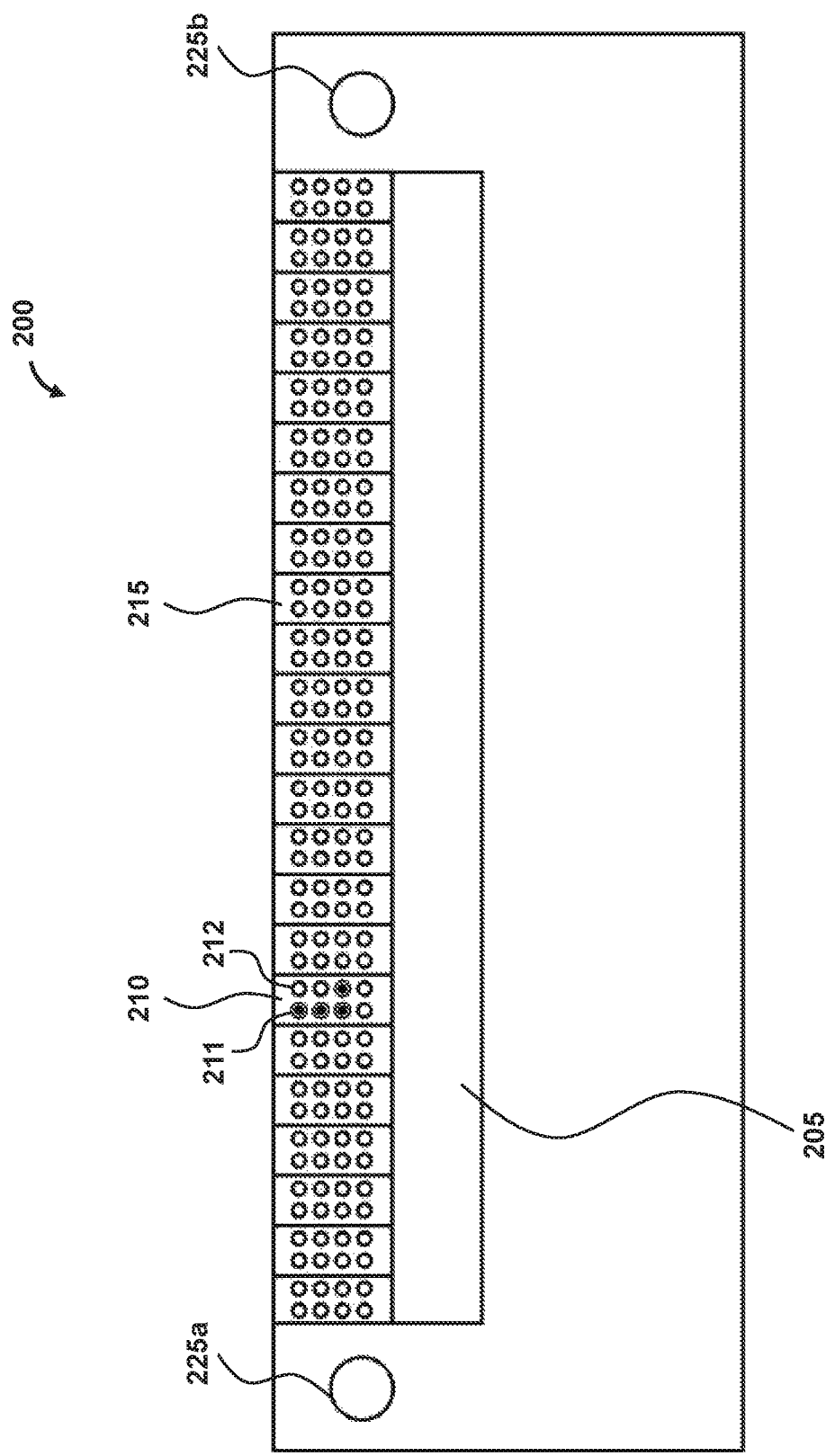
FIG. 2A shows a Braille device configured to exhibit tactile data, in accordance with one or more embodiments.

FIG. 2A shows a Braille device 200 configured to exhibit tactile data, in accordance with one or more embodiments. In some embodiments, Braille device 200 is similar to tactile system 150 of FIG. 1A or 1B. Braille device 200 includes display 205 having a number of Braille cells (e.g., Braille cell 210 and Braille cell 215) in which each cell may present tactile data in the form of Braille code. In some embodiments, Braille code represents a character using raised dots and the number and arrangement of these dots in a cell distinguish one character from another. In FIG. 2A, Braille device 200 uses an eight-dot Braille cell to represent a character, but other dot systems are possible as well (e.g., six-dot Braille cell). For example, in an eight-dot system having two columns of four dots, a tactile representation of character "v" may have first three dots in a first column raised and a third dot in a second column raised. In some embodiments, Braille device 200 may present tactile data, e.g., a tactile representation of the character "v," by raising carbon nanotube components 110 (e.g., Braille pins) corresponding to the first three dots in a first column 211 and a third dot in a second column 212 of a Braille cell 210. A user may access the tactile representation by a tactile method (e.g., touching the carbon nanotube-based components).

While Braille device 200 shows a single line or row of Braille cells, in some embodiments, Braille device 200 may have multiple rows of Braille cells. In some embodiments, Braille device 200 may include sensors, such as a photo sensor 225a and a camera 225b, to obtain environmental data, as described at least with reference to sensor(s) 115 of FIG. 1A above. For example, the photo sensor 225a may obtain an amount of light in an environment in which Braille device 200 is located and camera 225b may obtain image or audio/video data in the environment.

Figure 2B:
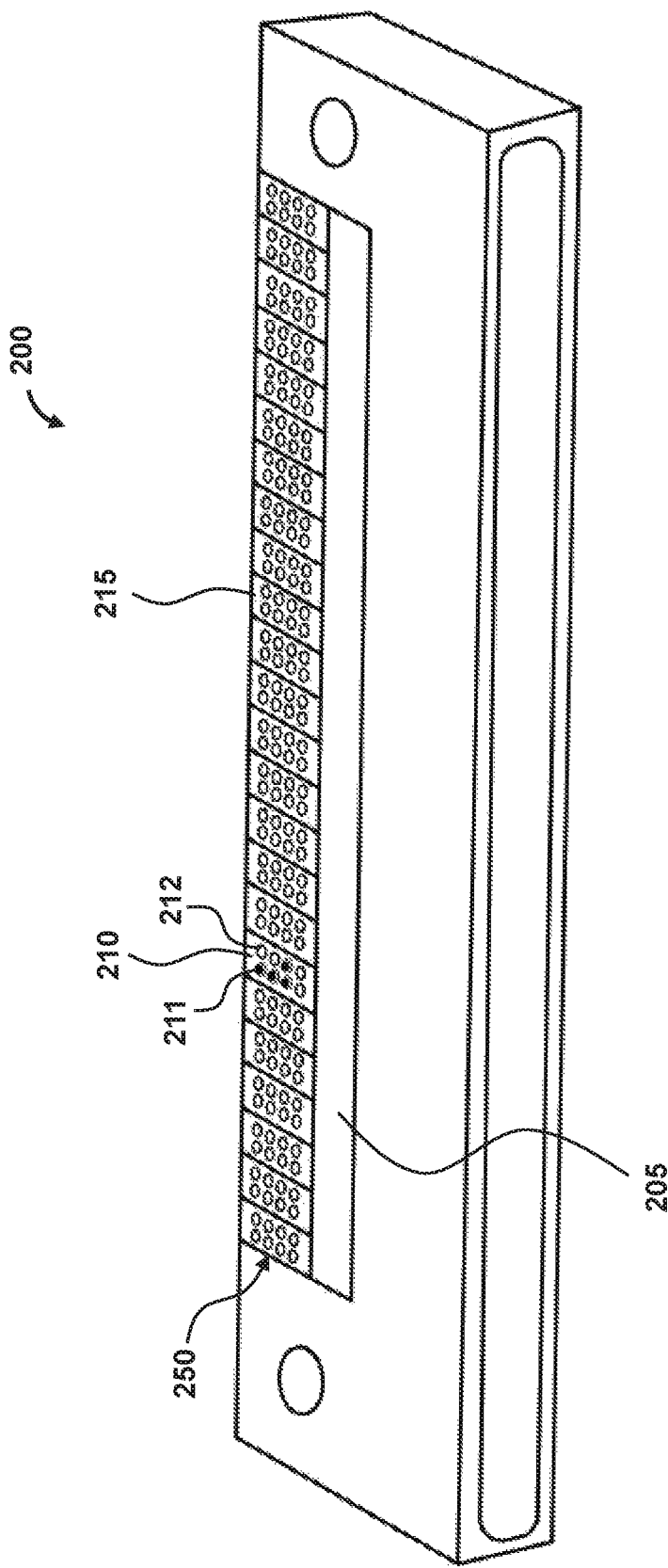
FIG. 2B illustrates a perspective view of Braille device of FIG. 2A in accordance with one or more embodiments.

FIG. 2B illustrates a perspective view of Braille device 200 in accordance with one or more embodiments. In some embodiments, display 205 has a carbon nanotube-based surface 250. As described above, a carbon nanotube-based surface is a surface made of or coated with carbon nanotube-based material, which may absorb almost all visible light (e.g., at least 96%, 98%, 99.6%, or other percentages). The perspective view in FIG. 2B also shows raised carbon nanotube components or carbon nanotube-based surface 250 in Braille cell 210.

Figure 3A:
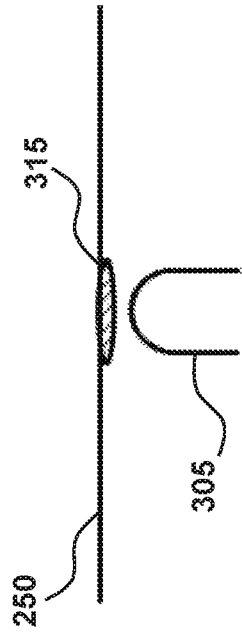
FIG. 3A shows an arrangement of a carbon nanotube-based component in the Braille device, in accordance with one or more embodiments.

FIG. 3A shows an arrangement of a carbon nanotube-based component in Braille device 200, in accordance with one or more embodiments. In some embodiments, each Braille cell of Braille device 200 may have a number of openings (e.g., as many as number of dots used in Braille code) on the carbon nanotube-based surface 250 through which carbon nanotube-based components may be raised or lowered. For example, Braille cell 210 may have eight such openings for raising or lowering carbon nanotube-based components corresponding to the eight-dot system. The example of FIG. 3A shows one such opening 310 in Braille cell 210 through which a carbon nanotube-based component 305 may be raised or lowered. In some embodiments, the carbon nanotube-based component 305 is similar to the carbon nanotube-based components 110 of FIG. 1A.

Figure 3B:
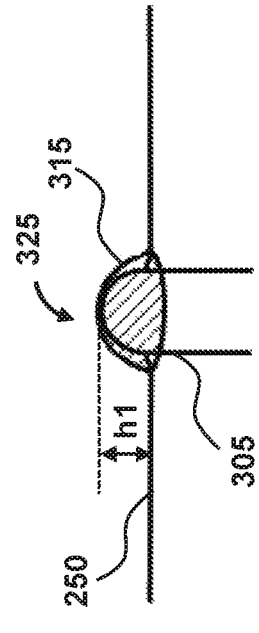
FIG. 3B shows a carbon nanotube-based component raised to a first height, in accordance with one or more embodiments.
Figure 3C:
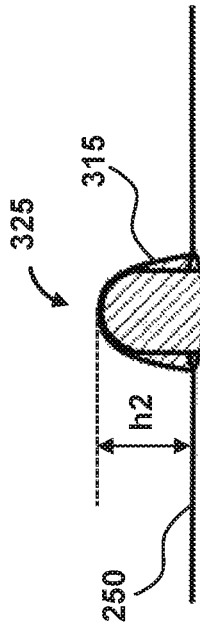
FIG. 3C shows a carbon nanotube-based component raised to a second height, in accordance with one or more embodiments.

FIGS. 3B and 3C show the carbon nanotube-based component 305 raised to two different heights in Braille device 200, in accordance with one or more embodiments. As described above at least with respect to FIG. 1A, carbon nanotube-based components 110 corresponding to the tactile data may be raised to different heights based on the environmental data. FIG. 3B shows one of the carbon nanotube-based components 110 corresponding to the tactile data, e.g., carbon nanotube-based component 305, raised to a first height, "$h_1$," based on the environment data. For example, carbon nanotube-based component 305 may be raised to the first height based on the amount of light satisfying (e.g., exceeding) a first threshold or based on the presence data indicating presence of a person(s) other than the specified user.

FIG. 3C shows carbon nanotube-based component 305 raised to a second height, "$h_2$" (e.g., "$h_2$">"$h_1$") based on the environment data. For example, carbon nanotube-based component 305 may be raised to the second height different from the first height based on the amount of light not satisfying (e.g., equal to or below) the first threshold or based on the presence data not indicating presence of a person(s) other than the specified user. Note that while FIGS. 3B and 3C show just one carbon nanotube-based component being raised, in some embodiments, all carbon nanotube-based components corresponding to the tactile data may be raised to the first height or the second height. A user may access the tactile representation by a tactile method (e.g., touching the carbon nanotube-based components).

Figure 3D:
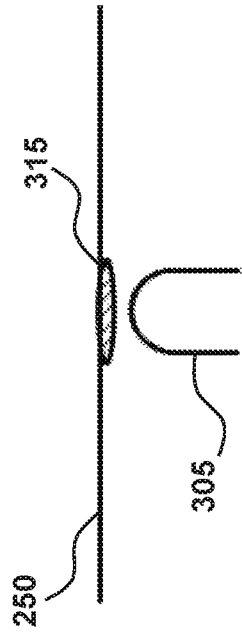
FIG. 3D shows a carbon nanotube-based stretchable material covering a carbon nanotube-based component, in accordance with one or more embodiments.
Figure 3E:
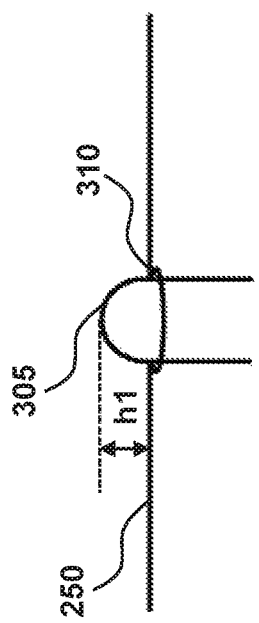
FIG. 3E shows a carbon nanotube-based component raised to a first height, in accordance with one or more embodiments.
Figure 3F:
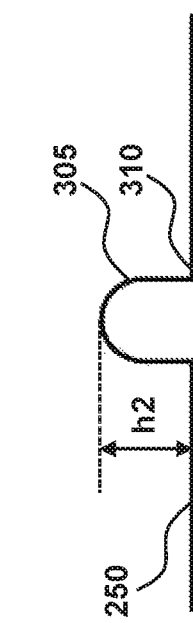
FIG. 3F shows a carbon nanotube-based component raised to a second height, in accordance with one or more embodiments.

In the embodiments of FIGS. 3A-3C, the carbon nanotube-based components are shown as being raised through an opening in the carbon nanotube-based surface 250. In some embodiments, the opening may be covered with carbon nanotube-based stretchable material 315, as shown in FIG. 3D. When the carbon nanotube-based component 305 is raised, the carbon nanotube-based stretchable material 315 may be pushed away from the carbon nanotube-based surface 250, thereby causing a "bump" 325 as shown in FIGS. 3E and 3F. FIG. 3E, like FIG. 3B, shows carbon nanotube-based component 305, raised to a first height, causing a bump 325 of height "$h_1$," near carbon nanotube-based component 305. FIG. 3F, like FIG. 3C, shows carbon nanotube-based component 305 raised to a second height, causing a bump 325 of "$h_2$" (e.g., "$h_2$">"$h_1$") near carbon nanotube-based component 305. A user may access the tactile representation by a tactile method (e.g., touching the bump 325).

Figure 4:
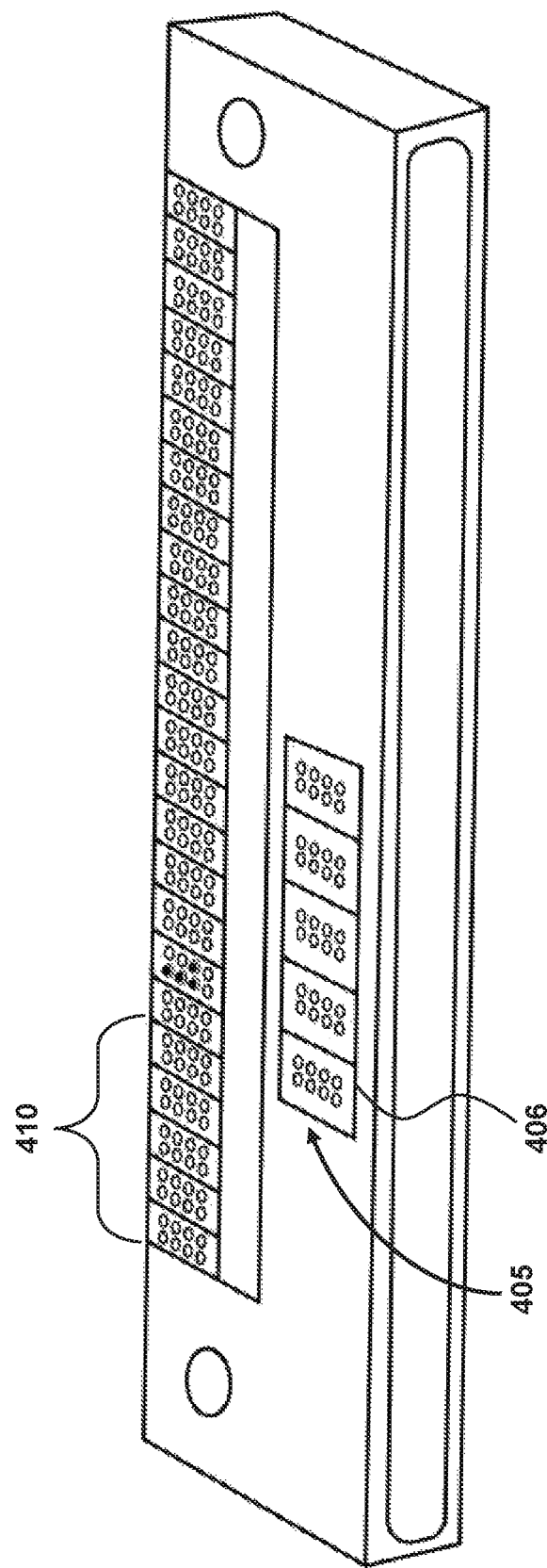
FIG. 4 shows a Braille device having selectable portions for inputting data, in accordance with one or more embodiments.

FIG. 4 shows a Braille device 200 having selectable portions for inputting data, in accordance with one or more embodiments. Users may input tactile data using Braille device 200 via selectable portions. For example, one or more Braille cells, such as Braille cells 410, in display 205 may be configured as selectable portions that a user may select (e.g., by touching or pressing) to input data to Braille device 200. In another example, Braille device 200 may include input keys, such as input keys 405, that a user may use (e.g., touch or press) to input data. In some embodiments, Braille device 200 may assign user-selectable input values to the selectable portions and cause presentation of the user-selectable input values on the selectable portions by adjusting the positions of carbon nanotube-based components 110 associated with the selectable portions based on the user-selectable input values and the environmental data. For example, Braille device 200 may assign a user-selectable input value, such as number "1," to a selectable portion, such as input key 406, and display a tactile representation of the value "1" on input key 406 by raising carbon nanotube-based components 110 in input key 406 based on the value "1" and the environmental data (e.g., raising to a specified height). When a user selects (e.g., by touching or pressing) the input key 406, the value "1" assigned to the input key 406 is received. Further, in some embodiments, Braille device 200 may assign, or change the assigned, user-selectable input values to the selectable portions dynamically to make the user input of data more secured against sight-based access. For example, Braille device 200 may assign value "1" to the input key 406 in a first instance (e.g., when the Braille device 200 is powered on, for performing a first transaction, for a first period, etc.), and may update the assignment by assigning a value "2" to the input key 406 in a second instance (e.g., when the Braille device 200 is powered off and powered on, for performing a second transaction, for a second period, etc.) to make inputting of data more secured against sight-based access.

Figure 5:
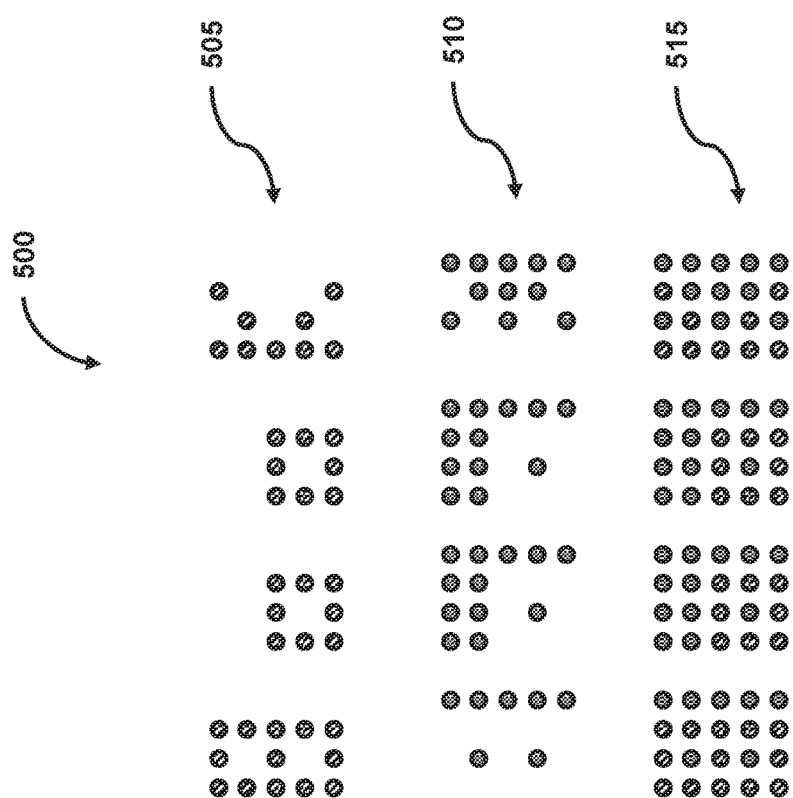
FIG. 5 shows an example of obfuscation of tactile data presented in the tactile system, in accordance with one or more embodiments.

FIG. 5 shows an example 500 of obfuscation of tactile data presented in tactile system 150, in accordance with one or more embodiments. Tactile system 150 may further adjust a presentation of tactile data 505 based on the environmental data by presenting obfuscation data 510 to keep the tactile data secure from sight-based access. For example, if tactile system 150 determines a presence of a person other than the specified user associated with tactile system 150 in the proximity of tactile system 150 (e.g., using environmental data obtained from sensor(s) 115 as described above), tactile system 150 may present obfuscation data 510 with the tactile data 505 (e.g., Book). In some embodiments, tactile system 150 may combine obfuscation data 510 (e.g., filler data to hide the representation of "Book") with the tactile data 505, and display combined tactile data 515 on display 105. In some embodiments, the tactile data 505 and obfuscation data 510 may be displayed at different heights. For example, tactile data 505 may be presented at a first height by raising the carbon nanotube-based components 110 corresponding to tactile data 505 to the first height, and obfuscation data 510 may be presented at a second height greater than the first height by raising the carbon nanotube-based components 110 corresponding to obfuscation data 510 to the second height. Other methods of data obfuscation are also possible. For example, obfuscation data 510 may be displayed as alternate characters in tactile data 505.

Example Flowchart

Figure 6:
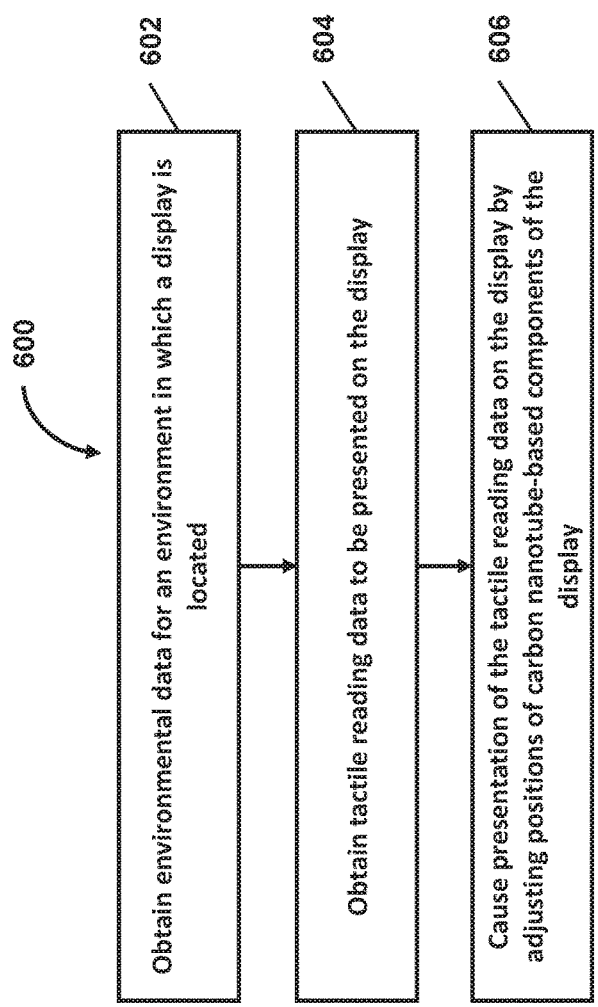
FIG. 6 is an example flowchart of facilitating secure data presentation by obstructing sight-based access to tactile data presented in the tactile system, in accordance with one or more embodiments.

FIG. 6 is an example flowchart 600 of facilitating secure data presentation by obstructing sight-based access to tactile data presented in a tactile system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 602, environmental data of an environment in which tactile system 150 is located is obtained. In some embodiments, environmental data may include environmental parameters such as lighting data, presence data, or other environmental data. As an example, lighting data may include illuminance data, contrast data, color data, or other lighting data. In some use cases, the lighting data may indicate an amount of light in an environment in which tactile system 150 is located, an amount of light near a portion of tactile system 150 (e.g., near the display), an amount of contrast between adjacent portions of tactile system 150, or colors reflected from one or more surfaces of tactile system 150 or other surfaces of the environment, etc. In some embodiments, presence data may indicate a presence of a person(s) other than a specified user associated with tactile system 150 (e.g., a vision-impaired user) in the environment. Operation 602 may be performed by a subsystem that is the same as or similar to sensor subsystem 160, in accordance with one or more embodiments.

In an operation 604, tactile data to be presented on display 105 of tactile system 150 is obtained. In some embodiments, the tactile data is obtained from an external device, such as a computer system 130 connected to tactile system 150. Operation 604 may be performed by a subsystem that is the same as or similar to data subsystem 155, in accordance with one or more embodiments.

In an operation 606, the tactile data is presented on display 105 by adjusting positions of carbon nanotube-based components 110 based on the environmental data. In some embodiments, display 105 has a carbon nanotube-based surface, which absorbs a significant amount of visible light (e.g., at least 96%, 98%, 99.6%, or other percentages), thereby obstructing a sight-based access to the tactile data.

In some embodiments, presentation of the tactile data on display 105 is adjusted by raising the carbon nanotube-based components 110 to different heights based on the environmental data. For example, tactile system 150 may raise the carbon nanotube-based components 110 corresponding to the tactile data to a first height based on the amount of light satisfying a first threshold (e.g., amount of light exceeding the first threshold) or based on the presence data indicating presence of a person(s) other than the specified user in the proximity of tactile system 150. Continuing with the example, tactile system 150 may raise the carbon nanotube-based components 110 to a second height different from the first height (e.g., greater than the first height) based on the amount of light not satisfying the first threshold (e.g., the amount of light equal to or below the first threshold) or based on the presence data not indicating presence of a person(s) other than the specified user in the proximity of tactile system 150. Operation 606 may be performed by a subsystem that is the same as or similar to presentation subsystem 165, in accordance with one or more embodiments.

In some embodiments, the various computers and subsystems illustrated in FIGS. 1A-1B may include one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of tactile system 150, computer system 130, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 105-120 described herein is for illustrative purposes, and is not intended to be limiting, as any of subsystems 105-120 or 155-165 may provide more or less functionality than is described. For example, one or more of subsystems 105-120 or 155-165 may be eliminated, and some or all of its functionality may be provided by other ones of subsystems 105-120 or 155-165. As another example, additional subsystems may be programmed to perform some, or all of the functionality attributed herein to one of subsystems 105-120 or 155-165.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

The present techniques will be better understood with reference to the following enumerated embodiments:

1. A method comprising: obtaining tactile reading data; and causing presentation of the tactile reading data on a display comprising display components having a surface that absorbs at least 96% of visible light, wherein causing the presentation includes adjusting one or more positions of the display components based on the tactile reading data.
2. The method of embodiment 1, wherein the display components include carbon nanotube-based components.
3. The method of any of embodiments 1-2, further comprising: obtaining, via one or more sensors, environmental data for an environment in which the display is located, wherein the environmental data includes lighting data, which indicates an amount of light in the environment.
4. The method of any of embodiments 1-3, wherein the adjusting includes adjusting the one or more positions of the display components by raising one or more of the display components to a first height in response to the amount of light satisfying a threshold.
5. The method of embodiment 4, wherein the adjusting includes adjusting the one or more positions of the display components by raising one or more of the display components to a second height in response to the amount of light not satisfying the threshold, wherein the second height is different from the first height.
6. The method of any of embodiments 1-5, further comprising: obtaining, via one or more sensors, environmental data for an environment in which the display is located, wherein the environmental data includes presence data, which indicates a presence of one or more users other than a user associated with the display device in the environment.

7. The method of embodiment of 6, wherein the adjusting includes adjusting the one or more positions of the display components by raising one or more of the display components to a first height in response to the presence data not indicating a presence of the one or more users.

8. The method of embodiment 7, wherein the adjusting includes adjusting the one or more positions of the display components by raising one or more of the display components to a second height in response to the presence data indicating a presence of the one or more users, wherein the second height is greater than the first height.

9. The method of any of embodiments 1-8, wherein causing the presentation of the tactile reading data on the display includes: raising a first set of the display components to a first height based on the tactile reading data; and raising a second set of the display components to a second height based on obfuscation data in connection with the raising of the first set of display components, wherein the second height is different than the first height.

10. The method of embodiment 9, wherein causing the presentation of the tactile reading data on the display includes: causing presentation of decoy data on a surface of the system that absorbs less than 96% of visible light such that the decoy data is presented at a same time as the presentation of the tactile data on the display.

11. The method of any of embodiments 1-10, further comprising: assigning user-selectable input values to a plurality of selectable portions of the surface based on assignment data; and causing presentation of the user-selectable input values on the plurality of selectable portions by adjusting the one or more positions of the display components based on the user-selectable input values and environmental data for an environment in which the display is located.

12. The method of embodiments 11, further comprising: receiving a user-selectable value of the user selectable values as a user input in response to user selection of a selectable portion of the selectable portions.

13. The method of embodiment 12, further comprising: changing the user-selectable input values assigned to the plurality of selectable portions dynamically.

14. The method of embodiment 13, wherein the plurality of selectable portions corresponds to a plurality of input keys associated with the display for receiving user input data.

15. The method of any of embodiments 1-15, further comprising: obtaining the tactile data from a computer system connected to the system.

16. A tangible, non-transitory, machine-readable medium storing instructions that, when executed by a data processing apparatus, cause the data processing apparatus to perform operations comprising those of any of embodiments 1-15.

17. A system comprising: one or more processors; and memory storing instructions that, when executed by the processors, cause the processors to effectuate operations comprising those of any of embodiments 1-15.

What is claimed is:

1. A Braille display device for facilitating secure data presentation by obstructing sight-based access to one or more input or output display portions of the Braille display device, the Braille display device comprising:
a display comprising carbon nanotube-based components and a carbon nanotube-based surface that absorbs at least 98% of visible light, wherein the display is configured to exhibit tactile reading data in Braille on the carbon nanotube-based surface via a positional adjustment of the carbon nanotube-based components;
one or more sensors configured to obtain lighting data for an environment in which the display is located, wherein the lighting data indicates an amount of light in the environment; and
circuitry configured to:
obtain the tactile reading data; and
cause a secure presentation of the tactile reading data on the carbon nanotube-based surface of the display by adjusting one or more positions of the carbon nanotube-based components based on (i) the tactile reading data and (ii) the lighting data.

2. The Braille display device of claim 1, wherein the circuitry is configured to adjust the one or more positions by:
raising one or more carbon nanotube-based components of the carbon nanotube-based components to a first height in response to the amount of light satisfying a threshold; and
raising the one or more carbon nanotube-based components to a second height in response to the amount of light not satisfying the threshold, wherein the second height is greater than the first height.

3. The Braille display device of claim 1, wherein the circuitry is configured to cause a secure presentation of the tactile reading data by causing presentation of a user-selectable input value on a selectable portion of the carbon nanotube-based surface by adjusting the one or more positions of the carbon nanotube-based components based on (i) the user-selectable input value and (ii) the lighting data, wherein the circuitry is further configured to:
receive the user-selectable input value as a user input in response to user selection of the selectable portion of the carbon nanotube-based surface.

4. A system comprising:
a display comprising carbon nanotube-based components, wherein each carbon nanotube-based component of the carbon nanotube-based components comprises a surface that absorbs at least 96% of visible light; and
circuitry configured to:
obtain tactile reading data; and
cause presentation of the tactile reading data on the display by adjusting one or more positions of the carbon nanotube-based components based on the tactile reading data.

5. The system of claim 4, wherein the carbon nanotube-based components include Braille pins.

6. The system of claim 4, further comprising:
one or more sensors to obtain environmental data for an environment in which the display is located, wherein the environmental data includes lighting data, which indicates an amount of light in the environment.

7. The system of claim 6, wherein the circuitry is configured to adjust the one or more positions of the carbon nanotube-based components by raising one or more of the carbon nanotube-based components to a first height in response to the amount of light satisfying a threshold.

8. The system of claim 7, wherein the circuitry is configured to adjust the one or more positions of the carbon nanotube-based components by raising one or more of the carbon nanotube-based components to a second height in response to the amount of light not satisfying the threshold, wherein the second height is different from the first height.

9. The system of claim 4 further comprising:
one or more sensors to obtain environmental data for an environment in which the display is located, wherein the environmental data includes presence data, which indicates a presence of one or more users other than a user associated with the display in the environment.

10. The system of claim 9, wherein the circuitry is configured to adjust the one or more positions of the carbon nanotube-based components by raising one or more of the carbon nanotube-based components to a first height in response to the presence data not indicating a presence of the one or more users.

11. The system of claim 10, wherein the circuitry is configured to adjust the one or more positions of the carbon nanotube-based components by raising one or more of the carbon nanotube-based components to a second height in response to the presence data indicating a presence of the one or more users, wherein the second height is greater than the first height.

12. The system of claim 4, wherein the circuitry is configured to cause presentation of the tactile reading data on the display by:
raising a first set of the carbon nanotube-based components to a first height based on the tactile reading data; and
raising a second set of the carbon nanotube-based components to a second height based on obfuscation data in connection with the raising of the first set of the carbon nanotube-based components, wherein the second height is different than the first height.

13. The system of claim 12, wherein circuitry is configured to cause presentation of the tactile reading data on the display by:
causing presentation of decoy data on a surface of the system that absorbs less than 96% of visible light such that the decoy data is presented at a same time as the presentation of the tactile reading data on the display.

14. The system of claim 4, wherein the circuitry is further configured to:
assign user-selectable input values to a plurality of selectable portions of the surface based on assignment data; and
cause presentation of the user-selectable input values on the plurality of selectable portions by adjusting the one or more positions of the carbon nanotube-based components based on the user-selectable input values and environmental data for an environment in which the display is located.

15. The system of claim 14, wherein the display is further configured to:
receive a user-selectable input value of the user-selectable input values as a user input in response to user selection of a selectable portion of the plurality of selectable portions.

16. The system of claim 14, wherein the circuitry is configured to change the user-selectable input values assigned to the plurality of selectable portions dynamically.

17. The system of claim 14, wherein the plurality of selectable portions corresponds to a plurality of input keys associated with the display for receiving user input data.

18. A method comprising:
obtaining environmental data for an environment in which a display is located, wherein the display comprises carbon nanotube-based components and a carbon nanotube-based surface that absorbs at least 96% of visible light, and wherein the environmental data indicates one or more environmental parameters related to the environment;
obtaining tactile reading data to be presented on the carbon nanotube-based surface of the display; and
causing presentation of the tactile reading data on the carbon nanotube-based surface of the display by adjusting one or more positions of the carbon nanotube-based components based on (i) the tactile reading data and (ii) the environmental data.

19. The method of claim 18, wherein obtaining the environmental data includes:
obtaining lighting data as one of the one or more environmental parameters, wherein the lighting data indicates an amount of light in the environment.

20. The method of claim 19, wherein causing the presentation of the tactile reading data includes:
adjusting the one or more positions of the carbon nanotube-based components by raising one or more of the carbon nanotube-based components to (i) a first height in response to the amount of light satisfying a threshold, and (ii) a second height in response to the amount of light not satisfying the threshold, wherein the second height is different from the first height.

* * * * *